April 26, 1966 I. J. BELASCO ETAL 3,248,255
PARTICULATE UREA COATED WITH UREA-FORMALDEHYDE
AND PROCESS OF MAKING SAME
Filed Oct. 24, 1961

INVENTORS
IRVIN J. BELASCO
ROBERT J. CHURCH

BY Frederick F. Butzi

ATTORNEY

United States Patent Office 3,248,255
Patented Apr. 26, 1966

3,248,255
PARTICULATE UREA COATED WITH UREA-FORMALDEHYDE AND PROCESS OF MAKING SAME
Irvin J. Belasco and Robert J. Church, both of Wilmington, Del., assignors to E. I. du Pont de Nemours and Company, Wilmington, Del., a corporation of Delaware
Filed Oct. 24, 1961, Ser. No. 147,375
8 Claims. (Cl. 117—100)

This invention relates to a novel process for the preparation of urea-formaldehyde polymers. It is more particularly directed to a process whereby urea-formaldehyde polymers are produced by reacting a particulate urea with gaseous formaldehyde under substantially dry conditions.

By varying the reaction conditions and the particle size of the urea starting material, it is possible, according to this invention, to produce urea-formaldehyde products ranging from a particulate urea-formaldehyde polymer to a particulate urea having a coating of urea-formaldehyde polymer.

Figure 1:
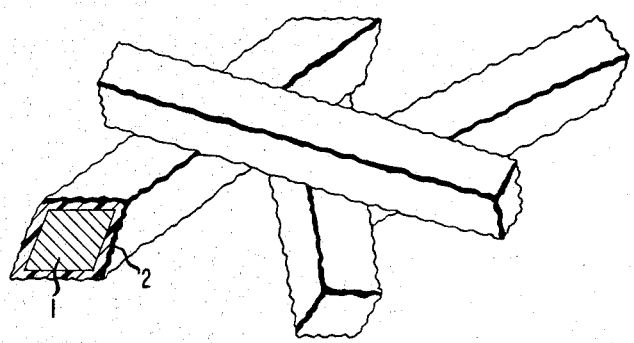
FIGURE 1 is a representation of urea crystals coated with urea-formaldehyde polymers according to this invention.

Briefly, the process of this invention is carried out by reacting particulate urea, in either the shotted or prilled, or crystal form, with gaseous formaldehyde in the presence of a suitable catalyst, under substantially dry conditions. The reaction can be carried out in one vessel without the removal of intermediate products.

Conventional equipment can be used, but it is preferred that a reactor which is capable of agitating or tumbling its contents be used because it ensures complete contact between the reactants.

The urea starting material used in the process of this invention can be any particulate urea such as commercially available prilled or shotted, or crystal ureas.

In the preparation of coated particles, shotted urea is preferred as a starting material because it permits the formation of a particle having a maximum amount of available urea with a minimum amount of urea-formaldehyde polymer coating. Its spherical shape also makes it easier to obtain a uniform coating of the polymer.

Crystal urea is preferred as a starting material when particulate urea-formaldehyde polymers are produced because the necessary small particles for the preparation of such a product are more easily obtained as crystals than as prilled or shotted particles.

The particle size of the urea starting material is governed by the urea-formaldehyde product desired. If complete or substantially complete reaction of the urea with formaldehyde to give a polymer is desired, the particles are preferably of smaller diameter, ranging from those just held on a USS No. 325 screen to those which just pass a USS No. 20 screen (44 microns to 840 microns diameter). Larger particles can be treated, but proportionately less of the urea is reacted than is ordinarily desired.

If the purpose of the reaction is to obtain urea particles coated with a urea-formaldehyde polymer, it is desirable to use urea particles having a somewhat larger size. These particles, either crystal or prilled or shotted, will range upwardly in diameter from those held on a USS No. 40 screen to those passing a USS No. 3 screen (420 microns to 6.7 millimeters diameter). Larger particles than this can be used, the ultimate size being limited by practical considerations.

In order to promote the reaction of urea and formaldehyde, it is desirable to have a catalyst present. Any of the catalysts conventionally used to promote the polymerization of urea and formaldehyde can be used. Because urea should be reacted with formaldehyde under substantially dry conditions, it is highly desirable to use a dry acidic gaseous catalyst. The gas can be fed into the reaction chamber while the urea is being agitated and prior to or during the introduction of formaldehyde. The catalyst is thus adsorbed on the urea particle and conditions it for reaction.

Suitable gaseous catalysts are $SO_2$, $SO_3$, $NO$, $NO_2$, $BF_3$ and $HCl$. $So_2$ is preferred.

The amount of gaseous catalyst used should be such that the normal alkalinity of commercially available urea is overcome, but not so great that a low pH is induced on the particulate urea surface, which would tend to promote the formation of high molecular weight, highly cross-linked, brittle polymers. Generally speaking, these gaseous catalysts should be used at concentrations of .01% to .5%, by weight, of the urea.

Water-soluble solid and liquid acidic catalysts can also be used. Such compounds as ammonium chloride, acetic anhydride, monopotassium phosphate, monosodium phosphate, metaphosphoric acid, orthophosphoric acid, sulfuric acid, hydrochloric acid, nitric acid, chlorosulfonic acid, dichloroacetic acid, trichloroacetic acid, and alkyl and aryl sulfonic acids are satisfactory. These acidic materials can be dissolved in water and sprayed onto the urea particles at a concentration of .01% to 10%, by weight, of the urea. Because the reaction with formaldehyde should be carried out under substantially dry conditions, excess water introduced into the reaction mass in this fashion must be removed. This is preferably done by applying moderate heat to the urea, while it is tumbled, until it becomes free-flowing. Those acidic materials which are liquid can be used directly, in the same proportions.

Such insoluble solid catalysts as calcium phosphate and superphosphate can also be used. These are ground into a fine powder which is then dusted uniformly over the surface of the urea particle. Such catalytic materials are ordinarily used at concentrations of from .05% to 20%, by weight, of the urea.

After the appropriate catalyst has been added to the urea in the reaction vessel, polymerization is initiated by exposing the particulate urea to gaseous formaldehyde. The formaldehyde can be introduced into the reaction chamber as free formaldehyde generated by any conventional technique, or it can be brought in as a solid in the form of paraformaldehyde or trioxane, or as any other formaldehyde derivative which yields free formaldehyde on the application of heat or acids.

Optionally, the free formaldehyde is introduced as a gaesous stream derived from the thermal decomposition of the hemiformal of cyclohexanol. Such a stream is made up of pure formaldehyde containing less than 0.1% of water.

The amount of formaldehyde used should be such that the resulting polymer, either as a particulate polymer or as a coating, has a urea-formaldehyde ratio of from 0.5 to 2.0. In the case of a coating, the precise amount to be used will be governed by the coating thickness desired and the percent of the total weight of the urea particle made up by the coating. In any event, the correct amount of formaldehyde to be used to obtain any particular product will be apparent to one skilled in the art.

The polymerization can be carried out at temperatures of from 25° C. to 125° C. For coatings, it is preferred to run the reaction at a temperature of from 40° C. to 70° C. because at this temperature more of the desirable lower molecular weight polymer is formed. The lower temperatures also give a urea-formaldehyde coating which is smoother and more uniform.

The polymerization is preferably carried out at atmospheric pressure. The partial pressure of the gaseous formaldehyde can range from 0.01 to 1 atmosphere.

The time required for the reaction is naturally dependent on the type of product desired, the concentration and type of catalyst, the particle size of the urea starting material, and the like. It is accordingly not possible to give a precise time. If the reaction is to produce a particulate urea-formaldehyde polymer, the reaction under preferred conditions should be substantially complete in from 1 to 30 minutes.

If a coated product product is to be prepared, the time will vary according to the thickness of the coating desired and the particle size of the urea starting material. Generally, reaction times of from 5 to 30 minutes will provide coatings of limited water permeability. In the final analysis, the length of time required to achieve any particular result will be best determined by periodic sampling and inspection.

The polymerization should be carried out under substantially dry conditions. If the reaction is carried out in the presence of more than about 5% water, based on the total weight of the reaction mass, the polymer coating on the urea particle becomes thick, uneven, non-continuous and highly variable in water permeability. In addition, some of the urea is dissolved in the excess water, making it difficult to maintain the reaction mass in particulate form. It is highly preferred, therefore, to conduct the polymerization with no more than from .05–2% water present.

In the preparation of particulate urea having a coating of urea-formaldehyde polymer, it is desirable to treat the urea particle with a modifying or stabilizing agent during or after the formation of the coating so that the product will retain its physical properties over an extended period.

This modification and stabilization can be accomplished by heating the coated particles at a temperature of from 80° to 125° C. for from 5 minutes to 3 hours.

Besides heat, any of the modifying and stabilizing agents conventionally used in the urea-formaldehyde polymer art can be used.

For example, a gas such as anhydrous ammonia can be used. This is fed into the reaction chamber while its contents are agitated. The gas is brought into the vessel at a partial pressure of 1 atmosphere or less and is kept in contact with the coated urea for from about 5 seconds to 5 minutes.

In a similar fashion, alkaline solids such as soda ash, calcium oxide, magnesium oxide, calcium carbonate, sodium hydroxide, dipotassium phosphate, disodium phosphate, trisodium phosphate, carbonate rich minerals having available alkalinity such as dolomitic limestone, and amines such as the mono-, di-, and tri-methylene amines or higher homologs of these, can be used.

The solids are finely ground and dusted uniformly over the surfaces of the coated urea particles, to give a concentration of about 2% or less, by weight.

Liquids such as hexamethylenediamine, furfuryl alcohol, furfuraldehyde, acetic anhydride and propionaldehyde can also be used as modifying and stabilizing agents. These are preferably sprayed into the reaction vessel or introduced as vapors while the vessel's contents are agitated, thus giving uniform contact and dispersion. Concentrations of from 0.1% to 1%, by weight, of the urea, are in most cases sufficient to confer the desired stabilization.

It will be apparent to one versed in the art of urea-formaldehyde polymers that the reaction conditions of this process are inextricably tied together and that the physical and chemical characteristics of the product can be varied by changing reaction conditions and varying the proportions of reactants. The changes necessary to obtain any particular polymer or coated product can be easily determined by an artisan. It is intended that all such variations and changes be embraced within this invention.

Urea-formaldehyde polymers produced according to this invention are particulate and display all the characteristics typical of urea-formaldehyde polymers. They can be made to have Activity Indexes in excess of 40, as defined by the Association of Official Agricultural Chemists.

The coated urea particles produced according to this process are novel, and so far as is known, cannot be produced by conventional methods. The coatings of these particles can range from 0.01 micron to 1 millimeter in thickness. The larger thicknesses are, of course, limited primarily to particles having larger dimensions.

The coating is continuous and uniform in thickness. It is an integral part of the particle since it is created on the particle surface using the particle itself as one of the reactants. This should be contrasted with the coated ureas known heretofore which bear irregular non-continuous coatings.

All this is illustrated in the drawings:

FIGURE 1 illustrates urea crystals which have been coated with a urea-formaldehyde polymer. The urea crystal 1 bears a uniform continuous coating 2 of urea-formaldehyde polymer.

Figure 2:
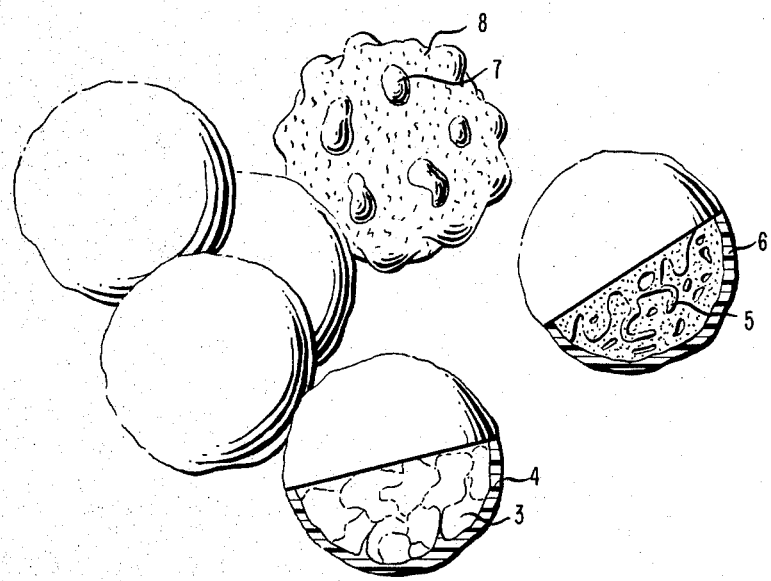
FIGURE 2 is a representation of urea shots or prills coated with urea-formaldehyde polymers according to this invetnion. The particle in the upper center illustrates a urea prill coated by processes used heretofore.

FIGURE 2 illustrates urea prills or shots coated with a urea-formaldehyde polymer. The particle in the lower center presents a cut-away view of a coated urea prill whose crystal aggregates 3 bear a uniform coating 4 of urea-formaldehyde polymer.

The particle on the right presents a cut-away view of a coated prill capsule which has had the urea dissolved out of it. The capsule is a shell 6 of urea-formaldehyde polymer. The concave surface of the interior of the capsule has conformed itself to the surface presented by the crystal aggregates of the urea when the prill was coated. Ridges and undulations 5 make this surface uneven.

The particle in the upper center is an illustration of a urea prill coated according to processes used heretofore. The urea-formaldehyde polymer coating 7 is non-continuous and varies in thickness. The surface of the urea prill 8 is exposed.

The urea-formaldehyde coatings are semipermeable to water. They can pass from .0005 to 2 milligrams of water per square centimeter per minute. This range defines a water dissolution time for the particles of from 10 minutes to 30 days.

Water dissolution time is an arbitrary measurement defined as the length of time required for 50% of the urea in the coated particle, when it is placed in water, to go into solution. Uncoated urea prills having a mesh size of −10+20 will go into complete solution in slightly less than one minute.

The water dissolution time can be determined by placing 0.25 gram of the coated urea into 50 ml. of water in a dish at 22–28° C. and then determining the length of time required for 50% of the urea to go into solution. This is done with the aid of a stereomicroscope or magnifying glass.

It will be observed that water enters the coated particle gradually and dissolves out the urea. As the urea dissolves, the spherical, smooth, transparent coating of urea-formaldehyde polymer becomes visible. As solution progresses, bubbles of air or gas entrapped in the urea during the prilling process coalesce within the particle. Solution will ultimately progress to the point where all of the urea has been dissolved from the particle, leaving behind a floating capsule of the urea-formaldehyde polymer containing an entrapped air bubble.

The particulate urea-formaldehyde polymers produced by the process of this invention can be used wherever such polymers are normally employed. For example, they can be used as fertilizer ingredients or in adhesives or sizings.

The coated ureas are useful in augmenting the diet of ruminants. Although urea has been used as a component of ruminant feeds, it has certain inherent disadvantages. Since the rate of solution and hydrolysis of urea to ammonia is so rapid, an extremely large excess of ammonia is supplied to the animal. This results in losses of dietary nitrogen, and if urea is fed in large amounts, can cause toxemia, and in severe cases, death of the animal.

The coated ureas of this invention have a slow rate of solution and will provide the animal with a controlled amount of urea over an extended period of time. The rapid release of ammonia and consequent toxemia are thereby avoided.

The water dissolution time for particles to be used in feeds should be from about 15 minutes to 24 hours.

The coated ureas are also highly useful as fertilizer ingredients. Again, the slow water solution rate of the product makes it possible to avoid fast hydrolysis and subsequent plant injury and losses of nitrogen from the soil before the plants can use it. The nitrogen accordingly becomes available to plants over a longer period of time and this, of course, is economically advantageous. For fertilizer use, the coated urea particles should have water dissolution times of from 10 minutes to 30 days, depending on specific requirements.

Used either in feeds or in fertilizers, the coated ureas will permit the preparation of vastly better products, since the coated ureas are not hygroscopic and will therefore aid in preventing caking.

The following examples are presented so that this invention will be more readily understood and more easily practiced.

*Example 1*

A mixer is charged with 200 parts of shotted urea having a particle size of −10+20 mesh. The urea is then exposed, while being agitated, to a stream of anhydrous SO₂ for a period of 15 to 30 seconds. The total amount of SO₂ entering the mixer is 0.1%, by weight, of the urea present.

Gaseous formaldehyde, generated by heating paraformaldehyde, is then fed into the mixer over a 20-minute period at a rate of 20 parts of formaldehyde for each 200 parts of urea. During this time, the temperature of the mixture is increased to and maintained at 40–60° C.

Agitation is then stopped and 2%, by weight of the urea, of disodium phosphate is added to the mixer. The mixture is agitated for 2 minutes.

The product is a coated urea particle which is dry and free-flowing. The coating is about 3 microns thick and has a urea-formaldehyde ratio of 1. The particle has a water dissolution time of about 60 minutes, which remains constant over a period of weeks.

This product, when added to a convention ruminant feed at a level of 1% and fed to animals, gives satisfactory growth rates.

*Example 2*

A coated urea product is prepared as set forth in Example 1, except that after polymerization, the product is stabilized by heating it at a temperature of 100° C. for 60 minutes.

The resulting product is substantially identical to that produced by the process of Example 1, except that it has a water dissolution time of 30 minutes. This product is stable for at least 3 months. When applied to wheat at or about the boot stage of growth, at a level of 160 pounds per acre, it gives excellent growth response with no visible plant injury.

*Example 3*

A mixer is charged with 200 parts of shotted urea having a particle size of −10+20 mesh. Six parts of 2 normal sulfuric acid are then sprayed onto the urea while it is being agitated. The urea is then tumbled at a temperature maintained below 60° C. until it becomes dry and free-flowing.

This mixture is then exposed to formaldehyde vapor. The formaldehyde is generated by heating paraformaldehyde. A total of 20 parts of formaldehyde for each 200 parts of urea is fed into the system over a period of 20 minutes. The temperature of the reaction is maintained in the range of 40–60° C.

The resulting coated urea product is then stabilized by adding 4 parts of disodium phosphate for each 200 parts of the coated urea. Tumbling is continued for 2 minutes to ensure complete coverage.

This coated urea has a water dissolution time of about 40 minutes. The polymeric film on the patricle is 2 microns thick and has a urea-formaldehyde ratio of about 1.

This product is an excellent turf fertilizer. When applied at the rate of 40 pounds per acre, it gives excellent growth response with no injury to the turf.

*Example 4*

A coated urea product is prepared substantially as described in Example 3, except that one part of 85% orthophosphoric acid in 5 parts of water is used as a catalyst.

This mixture is then exposed to gaseous formaldehyde and the resulting coated product is stabilized with 4 parts, by weight of the urea, of dolomitic limestone. Tumbling is continued for 2 minutes to ensure uniform coating.

The coated urea product has a water dissolution time of 20 minutes and its coating is about 2 microns thick.

*Example 5*

A mixer is charged with 200 parts of crystal urea having a particle size of −20+40 mesh. Three parts of 4 normal sulfuric acid are then sprayed onto the urea while it is tumbled.

This mixture is then dried by the application of heat. The temperature is kept below 60° C. and heating is continued until the urea is free-flowing.

The mixture is then exposed to gaseous formaldehyde at a rate of 20 parts of formaldehyde for each 200 parts of urea. Exposure time is 20 minutes. The temperature is maintained between 40 and 60° C.

The resulting coated urea product is stabilized by adding 4 parts of magnesium oxide and then tumbling the mixture for 2 minutes.

The product has a water dissolution time of 15 minutes. The coating is 0.5 micron thick and has a urea-formaldehyde ratio of about 1.

*Example 6*

A tumbler is charged with 200 parts of shotted urea having a particle size of −10+20 mesh. Two parts of normal superphosphate are then added, and the mixture tumbled. While this tumbling proceeds, 5 parts of finely-divided paraformaldehyde are added. Tumbling is continued for about 20 minutes at a temperature of 60–100° C.

The resulting coated particulate urea is stabilized by spraying on 4 parts of a 50% solution of hexamethylenediamine in water. This mixture is tumbled for 10 minutes at a temperature of from 60–100° C. The product is a dry free-flowing material.

The dissolution time of this product is 20 minutes.

The thickness of the polymeric coating is about 2 microns and its urea-formaldehyde ratio is about 1.

*Example 7*

A tumbler is charged with 60 parts of crystal urea having a particle size of −20+100 mesh. The urea is heated to about 60° C. and ½ part of normal superphosphate is added and thoroughly mixed with the urea.

Thirty parts of finely-divided paraformaldehyde are then added. The mixture is maintained at a temperature of from 80–90° C. The reaction is allowed to proceed for 3 minutes and the mixture is then removed from the tumbler and cooled to 35° C.

The resulting product is free-flowing. It is a substantially complete reaction product having an Activity Index of about 55. Its agronomic value is comparable to that of conventional ureaform fertilizers.

*Example 8*

To a closed tumbler are charged 60 parts of crystal urea having a mesh size of −20+100. Six one-hundredths part of $SO_2$ and 33 parts of finely-divided paraformaldehyde are then added. The container is closed and the contents are tumbled for 30 minutes. The temperature of the reaction is maintained at about 100° C.

The container is then permitted to cool to room temperature and the contents are removed.

The resulting polymer is a particulate free-flowing material having a urea-formaldehyde ratio of about 0.6. It can be used in the preparation of adhesives.

The embodiments of the invention in which an exclusive property or privilege is claimed are:

1. Particulate urea bearing a continuous coating of urea-formaldehyde polymer.

2. Particulate urea bearing a continuous coating of urea-formaldehyde polymer, said coating being 0.01 micron through 1 millimeter thick.

3. A process for the preparation of a particulate urea-formaldehyde polymer, said process comprising reacting at a temperature of from 25 to 125° C. urea with dry gaseous formaldehyde in the presence of an acidic catalyst and in the presence of no more than about 5% by weight of water based on the total weight of the reaction mass.

4. A process for the preparation of particulate urea bearing a continuous coating of urea-formaldehyde polymer, said process comprising reacting at a temperature of from 40° C. to 70° C. particulate urea with dry gaseous formaldehyde in the presence of an acidic catalyst and in the presence of no more than about 5% by weight of water based on the total weight of the reaction mass until said coating is formed.

5. A process for the preparation of particulate urea bearing a continuous coating of urea-formaldehyde polymer, said process comprising reacting at a temperature of from 40° C. to 70° C. particulate urea with dry gaseous formaldehyde in the presence of an acidic catalyst and in the presence of no more than about 5% by weight of water based on the total weight of the reaction mass until said coating is 0.01 micron through 1 millimeter thick.

6. In a process for the preparation of a particulate urea-formaldehyde polymer wherein particulate urea is reacted at a temperature of from 25 to 125° C. with dry gaseous formaldehyde in the presence of an acidic catalyst, the step comprising conducting said reaction in the presence of no more than about 5% by weight of water based on the total weight of the reaction mass.

7. In a process for the preparation of particulate urea bearing a continuous coating of urea-formaldehyde polymer wherein particulate urea is reacted at a temperature of from 40° C. to 70° C. with dry gaseous formaldehyde in the presence of an acidic catalyst until said coating is formed, the step comprising conducting said reaction in the presence of no more than about 5% by weight of water based on the total weight of the reaction mass.

8. In a process for the preparation of particulate urea bearing a continuous coating of urea-formaldehyde polymer wherein particulate urea is reacted at a temperature of from 40° C. to 70° C. with dry gaseous formaldehyde in the presence of an acidic catalyst until said coating is 0.01 micron through 1 millimeter thick, the step comprising conducting said reaction in the presence of no more than about 5% by weight of water based on the total weight of the reaction mass.

References Cited by the Examiner

UNITED STATES PATENTS

| | | | |
|---|---|---|---|
| 1,507,624 | 9/1925 | Pollak et al. | 260—69 |
| 2,754,275 | 7/1956 | Boyer | 260—68 |
| 2,947,750 | 8/1960 | Gerg | 260—67.6 |

WILLIAM H. SHORT, *Primary Examiner.*

HARLOD N. BURSTEIN, *Examiner.*